US006230662B1

(12) United States Patent
Miale et al.

(10) Patent No.: US 6,230,662 B1
(45) **Date of Patent: *May 15, 2001**

(54) ANIMAL LIFT AND TRANSPORT APPARATUS AND METHOD FOR USING THE SAME

(75) Inventors: Theresa Miale, 16038 Via Galan, Rancho Santa Fe, CA (US) 92067; Gloria Miale, Del Mar, CA (US); David Giuntoli; Tom Bailey, both of San Diego, CA (US)

(73) Assignee: Theresa Miale, Rancho Santa Fe, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/276,582

(22) Filed: Mar. 25, 1999

Related U.S. Application Data

(63) Continuation-in-part of application No. 09/102,293, filed on Jun. 22, 1998.

(51) Int. Cl.[7] .................................................. A01K 15/04

(52) U.S. Cl. ........................................ 119/727; 119/724

(58) Field of Search .................................. 119/28.5, 724, 119/725, 726, 727, 728; 5/610, 611, 616, 621; 296/20

(56) References Cited

U.S. PATENT DOCUMENTS

| | | | |
|---|---|---|---|
| 214,224 | 4/1879 | Winters . | |
| 2,967,510 * | 1/1961 | Stoody | 119/724 |
| 3,110,476 | 11/1963 | Farris . | |
| 3,245,366 | 4/1966 | Fox . | |
| 3,282,566 | 11/1966 | Clarke . | |

(List continued on next page.)

FOREIGN PATENT DOCUMENTS

| | | |
|---|---|---|
| 196 813 | 6/1938 | (CH) . |
| 18 10 628 | 9/1970 | (DE) . |
| 526 711 | 9/1940 | (GB) . |
| 887 994 | 1/1962 | (GB) . |
| 2 078 529 | 1/1982 | (GB) . |

OTHER PUBLICATIONS

R. C. Steele Catalog for Wholesale Pet Supplies, p. 11 (Jul. 1998).

Unknown Veterinarian Magazine, dbl.7 advertisement for Solo–Tech MINI Mobile Treatment/Propo Lift Table, p.?, (Date Unknown).

*Primary Examiner*—Peter M. Poon
*Assistant Examiner*—Elizabeth Shaw

(57) ABSTRACT

A method of transporting and lifting a large immobile animal for treatment of the animal includes transporting the animal with a transport cart and lifting the animal with a lift. The transport cart includes a generally rectangular collapsible frame having a front frame member pivotally attached to a rear frame member. A set of wheels are attached to the rear frame member for rolling movement of the cart. A handle is pivotally attached to the front frame member. A removable support sheet is carried by the frame. The lift includes a base supported by wheels for rolling movement of the lift, a lowered generally rectangular support frame, a generally rectangular support sheet carried by the generally rectangular support frame, a frame lifting mechanism disposed between the base and the frame, and a driving mechanism coupled to the lifting mechanism. The large immobile animal is transported with the cart by at least partially removing the support sheet from the frame of the cart, locating the support sheet under the animal, attaching the support sheet to the frame with the animal on the support sheet, and transporting the animal on the cart to a lift. At the lift, the support sheet is separated from the cart frame, the animal is transported onto the lift with the support sheet of the cart, and the driving mechanism is actuated to lift the animal to a height suitable for treatment or transferring the animal to a treatment table.

27 Claims, 5 Drawing Sheets

U.S. PATENT DOCUMENTS

| | | | | |
|---|---|---|---|---|
| 3,640,520 | * | 2/1972 | Wieland et al. | 5/610 |
| 3,644,944 | | 2/1972 | Bourgraf et al. . | |
| 3,700,229 | * | 10/1972 | Kurokawa et al. | 5/621 |
| 3,740,778 | | 6/1973 | Jordan et al. . | |
| 3,805,712 | | 4/1974 | Taylor et al. . | |
| 4,097,941 | | 7/1978 | Merkel . | |
| 4,558,847 | | 12/1985 | Coates . | |
| 4,579,381 | * | 4/1986 | Williams | 296/20 |
| 4,911,106 | * | 3/1990 | Goodwin | 119/724 |
| 5,842,443 | * | 12/1998 | Steinfort | 119/726 |
| 5,860,389 | * | 1/1999 | Caldwell | 119/28.5 |
| 6,089,192 | * | 7/2000 | Gent | 119/724 |

* cited by examiner

ANIMAL LIFT AND TRANSPORT APPARATUS AND METHOD FOR USING THE SAME

RELATED APPLICATIONS

This application is a continuation-in-part of application Ser. No. 09/102,293, filed Jun. 22, 1998, patent pending.

BACKGROUND OF THE INVENTION

This invention relates in general to the field of wheeled litters and lifts for transporting and lifting immobile large animals for treatment, and more particularly to a litter which facilitates placing an animal thereupon and transporting the animal to a lift, and is constructed to be subsequently used in conjunction with the lift for raising the large animal under power for treatment.

Lifting and transporting an immobile, injured or sick large animal without causing the animal discomfort or aggravating an injury is difficult. So an apparatus for lifting and transporting large animals in comfort is needed. (As used in this document, the word "large" includes animals which, if sick or injured or disabled due to age or some other reason, are large enough to present lifting and transportation difficulties to a handler.) Particularly for veterinarians, animal clinics, animal hospitals, humane societies, canine units and zoos, there is an urgent need for such an apparatus.

With the present invention, large immobile animals can be lifted and transported with relative ease and without causing further injury or unnecessary discomfort to the animal. It provides a way for a single person of ordinary strength to lift a very large, prone animal from the ground or floor and transport it. A significant advantage is that this invention has two components, a wheeled cart and a wheeled lift. The cart is light-weight and collapsible so it can easily be carried and stored by the user. The cart includes a sling that can be removed from the lift and placed under the animal. Once under the animal, the sling can be reattached to the cart and the animal can be carted to the lift. The sling can be detached from the cart and the animal can be carried by the sling to the lift by lifting at a pair of opposite handles on the sling and carrying the sling and animal to the lift. Preferably the lift is designed to elevate an animal weighing up to 200 pounds to a level approximately the height of an average treatment table, i.e., approximately 40 inches. This is sufficient to allow treatment to be conducted on a large animal while it remains on the lift, or the animal can be easily transferred therefrom to a treatment table. In its lowered or collapsed position the lift is relatively compact for storage in a vehicle or other storage space.

Other advantages and attributes of this invention will be readily discernable upon a reading of the text hereinafter.

SUMMARY OF THE INVENTION

An aspect of present invention involves a method of transporting and lifting a large immobile animal for treatment. The method includes transporting the animal with a transport cart and lifting the animal with a lift. The transport cart includes a generally rectangular collapsible frame having a front frame member pivotally attached to a rear frame member. A set of wheels are attached to the rear frame member for rolling movement of the cart. A handle is pivotally attached to the front frame member. A removable flexible support sheet is carried by the frame. The lift includes a base supported by wheels for rolling movement of the lift, a lowered generally rectangular support frame, a generally rectangular support sheet carried by the generally rectangular support frame, a frame lifting mechanism disposed between the base and the frame, and a driving mechanism coupled to the lifting mechanism.

To transport the large immobile animal, the flexible support sheet can be disconnected from the cart frame and pulled underneath the animal. The frame of the cart can then be placed over the animal and the sheet can be reconnected. Once the sheet is reconnected to the frame, straps attached to the sheet can be connected around the animal to hold it in place. Once the animal is secured on the sheet by the straps, the cart can then be raised onto its wheels and wheeled to the lift. Alternatively, the cart, with the large animal, can be carried to the lift, or, the flexible support sheet can be used alone to transfer the large animal to the lift. The support sheet with the animal is detached from the cart frame and then placed on the lift frame of the lift. The lift frame can then be raised, with the flexible sheet and animal on top, without having to separately pick up the animal and move it from the cart to the lift. The lift can then be wheeled to a desired location. Treatment can be given to the animal while on the lift. Alternatively, the flexible support sheet, since it is separate from the lift, can again be used to transport the animal from the lift to an operating table. This avoids the necessity of having to lift just the animal and the possible additional injury and discomfort it could cause.

BRIEF DESCRIPTION OF THE DRAWINGS

The drawings illustrate both the design and utility of multiple embodiments of the present invention, wherein.

DESCRIPTION OF THE PREFERRED EMBODIMENT

Figure 1:
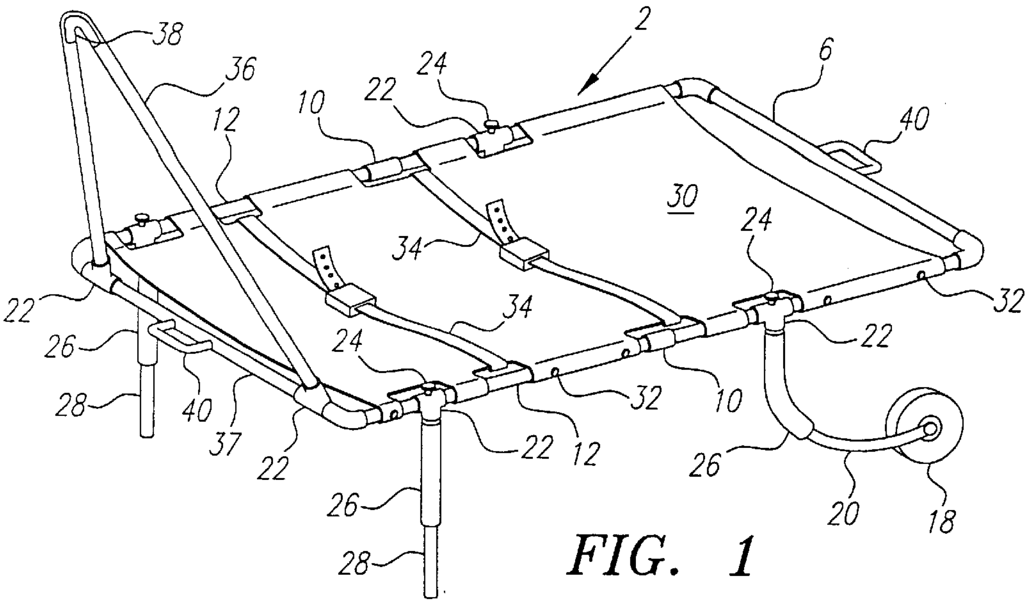
FIG. 1 is a top perspective view of a cart constructed in accordance with an embodiment of the invention.

With reference to FIGS. 1, 2, 5 and 6, the present invention has two independent, but cooperating components: a cart generally designated by the number 2, and a movable elevator (hereinafter referred to as the "lift") generally designated by the number 4. Both the cart 2 and the lift 4 preferably have a tubular metal frame construction for reduced weight. Both the cart 2 and the lift 4 are essentially of the same length and width.

With reference to FIGS. 1–4, the cart 2 has a polygonal frame 6 in the preferred shape of a rectangle. Preferably, structural tubular aluminum is used because of its light weight, and it allows the frame 6 to be easily fabricated. Three-quarter inch, schedule 40 aluminum pipe, with a clear anodize coating is used in the preferred embodiment and will adequately lift and support the weight of a 200 pound animal.

The frame 6 may also be constructed of other rigid structural materials. Long sides 12 of the frame 6 are made each of two equal lengths of tubing, 7A and 7B, joined by a vertically pivoting knuckle joint 8. The joint 8 is shown both locked (FIG. 4) and unlocked (FIG. 3) by a slidable sleeve 10. The knuckle joint 8 has a fork and a tongue therebetween pinned together to allow the joint 8 to be pivoted about the pin. The outer diameter of the joint 8 is preferably the same as that of the frame sides 12 so that the locking sleeve 10 can slide over the joint 8. To lock the joint 8, the sleeve 10 is moved over the pivoting joint 8 until it engages a locking pin 14 in an L-shaped channel 16 defined at an end of the sleeve 10. The sleeve 10 is locked in place by twisting it so that the pin 14 is caught in the base leg of the L-shaped channel 16. The locking sleeve 10 may be constructed of a strong, rigid plastic material, as well as metal pipe or tubing. The joints 8 allow the cart frame 6 to be folded in half for storage and more convenient carrying.

Figure 2:
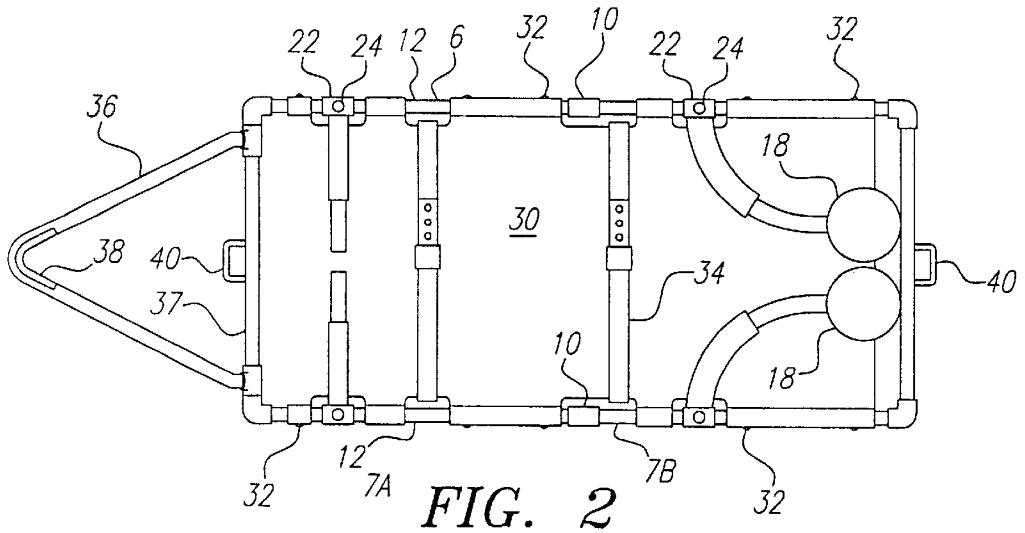
FIG. 2 is a top plan view of the cart of FIG. 1.

With reference to FIGS. 1 and 2, the illustrated embodiment of the cart 2 has two wheels 18. As used in this document the term "wheel" means any kind of wheel in general as well as casters, and the like. Each wheel 18 is rotatably attached to the end of a respective curved leg 20. The curved leg may be constructed of the same material as the frame 6. Each curved leg 20 is connected to a rotable sleeve 22 installed over a respective side member 12 of the frame 6 on opposite sides of the frame 6. The sleeves 10 are disposed a distance away from the end of the frame 6 so that the wheels 18 are disposed under the end for further leverage. Each rotatable sleeve 22 includes a detent pin 24 which protrudes through a hole in the sleeve 22 to lockingly engage a hole (not shown) defined by a respective side member 12. When the curved legs 20 are in vertical planes below their respective side members 12, the detent pins 24 will engage the locking holes, to lock the wheels 18 and their legs 20 in place for supporting and maneuvering the cart 2. When the detent pins 24 are raised out of their locking holes, the legs 20 are free to rotate axially about their respective side members 12. When wheels 18 are pivoted horizontally outward, the cart frame 6 can be laid flat on the ground to make it easier to place an animal thereon. The legs 20 can also be rotated to an essentially horizontal position above the cart 2 (as shown in FIG. 2), where they can be locked in position by the detent pins 24 in second locking holes in the side members. Alternatively, the legs 20 can be rotated to a generally horizontal position below cart 2, and locked there by corresponding detent holes. This minimizes the cart 2 for storage. Other detents for locking the sleeves 22 can be used, including a spring-biased sleeve which can be released by pulling on the leg 20. Since the legs 20 can be rotated to a position above the frame 6, a cushioning sleeve 26 may be installed over the curved legs 20 to prevent an injured animal that is being transported on the cart 2 from having direct contact with the hard legs 20.

With reference to FIGS. 1 and 2, straight support legs 28 are affixed to a pair of rotatable sleeves 22 installed over the side members 12 of the frame 6 near the front of the cart 2. The operation of the straight legs 28 and their rotatable sleeves 22 is similar to that for the curved legs 20. With detent pins 24 engaged in locking holes (not shown) when the legs 28 are vertical, the cart frame 6 will be supported by them. The detent pins 24 can also be disengaged, allowing the legs 28 to be rotated horizontally outward for placing the cart 2 flat on the ground. The straight legs 28 can also be pivoted into an essentially horizontal position above the cart 2, as shown in FIG. 2, or alternatively below the cart 2. In this position they can be locked in place by the detent pins 24 engaging additional locking holes (not shown) for compact storage. A cushioning sleeve 26 can also be installed over the upper end of the leg 28.

Figure 10:
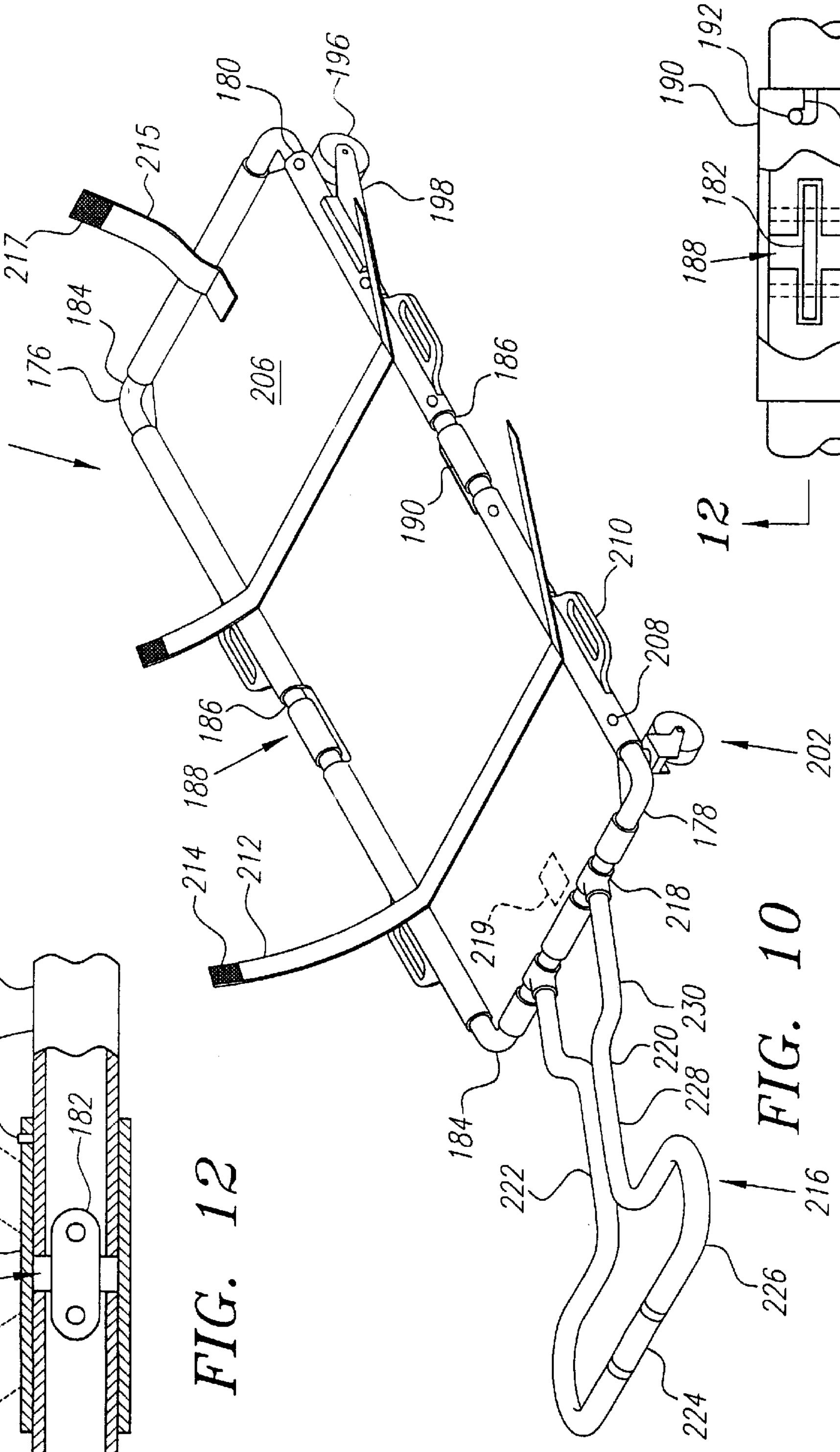
FIG. 10 is a top perspective view of a cart constructed in accordance with an alternative preferred embodiment of the invention.
Figure 11:
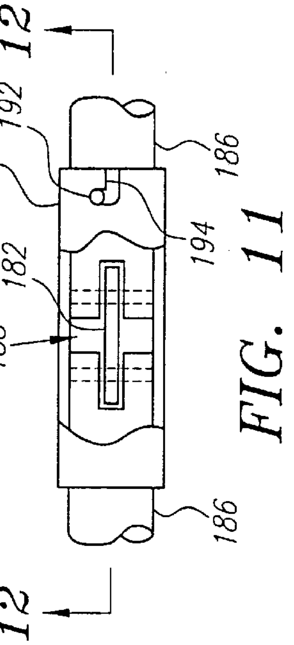
FIG. 11 is a top plan view, with portions broken away, of a vertically pivoting joint in a long side of the cart frame.

With reference again to FIGS. 1 and 2, a flexible support sheet 30 is stretched between the sides 12 of the frame 6 and connected by quick-release snaps 32 affixed along the lateral margins of the sheet 30. The snaps 32 engage with mating portions (not shown) affixed along the outsides of the frame side members 12. The support sheet 30 can be made of canvas but is preferably a similar material which has been covered or coated by a vinyl or similar material to allow the support sheet 30 to be easily cleaned and disinfected. Cutouts in the edges of the sheet 30 avoid interference with operation of the rotatable sleeves 22 and locking sleeves 10. Belts 34, preferably having quick-release fasteners such as opposing hook and loop strips, are disposed at appropriate locations along the frame 6 to strap an animal onto the sheet 30. The ends of the belts 34 are affixed to the sides of the support sheet 30. This allows the support sheet 30 to be removed from the frame 6 for use away from the cart 2 and still have the belts 34 secured around an animal. The belts 34 can also be used as handles or straps to allow the sheet 30 to be more easily moved into a position where it can be attached to the cart 2. In a preferred embodiment, as illustrated in FIGS. 10 and 11, the support sheet includes handles for moving the sheet and animal. With the sheet 30 positioned in an accessible location, the cart 2 can be maneuvered to the sheet 30. Its legs 20, 28 can be pivoted to a horizontal position, allowing the frame 6 of the cart 2 to be placed on the ground around the animal and the sheet 30. The sheet 30 can then be reattached by the snaps 32 to the frame 6 of the cart 2.

With reference again to FIGS. 1 and 2, a pivoting handle 36 is connected to a front end member 37 of the frame 6. The handle 36 is connected by rotatable sleeves 22 which are installed over the front end member 37 of the frame 6. The handle 36 can be made from the same material as the frame 6. A detent pin 24 installed in the sleeve 22 and locking holes (not shown) in the end member 37 of the frame 6 can be used to lock the handle 36 in selected positions.

A grip 38 attached to a forward bend of the handle 36 provides an improved hand-hold for easier control of the cart 2. The grip 38 is preferably a molded plastic or rubber material attached to the inner curve of the bend but could also be a piece of cushioning sleeve placed over the bend area. Two handles 40 can also be affixed at opposite ends of the frame 6 for use in lifting or carrying the cart 2 over obstacles.

To allow the cart 2 to be used over a wide variety of terrains, the wheels 18 are relatively large and wide, preferably approximately six inches in diameter by three inches wide. The wheels 18 are preferably made of a soft rubber or pneumatic construction to provide as much cushioning as possible. The curved legs 20 also help prevent the cart 2 from being caught as it is being pulled through brush or over obstacles.

Figure 5:
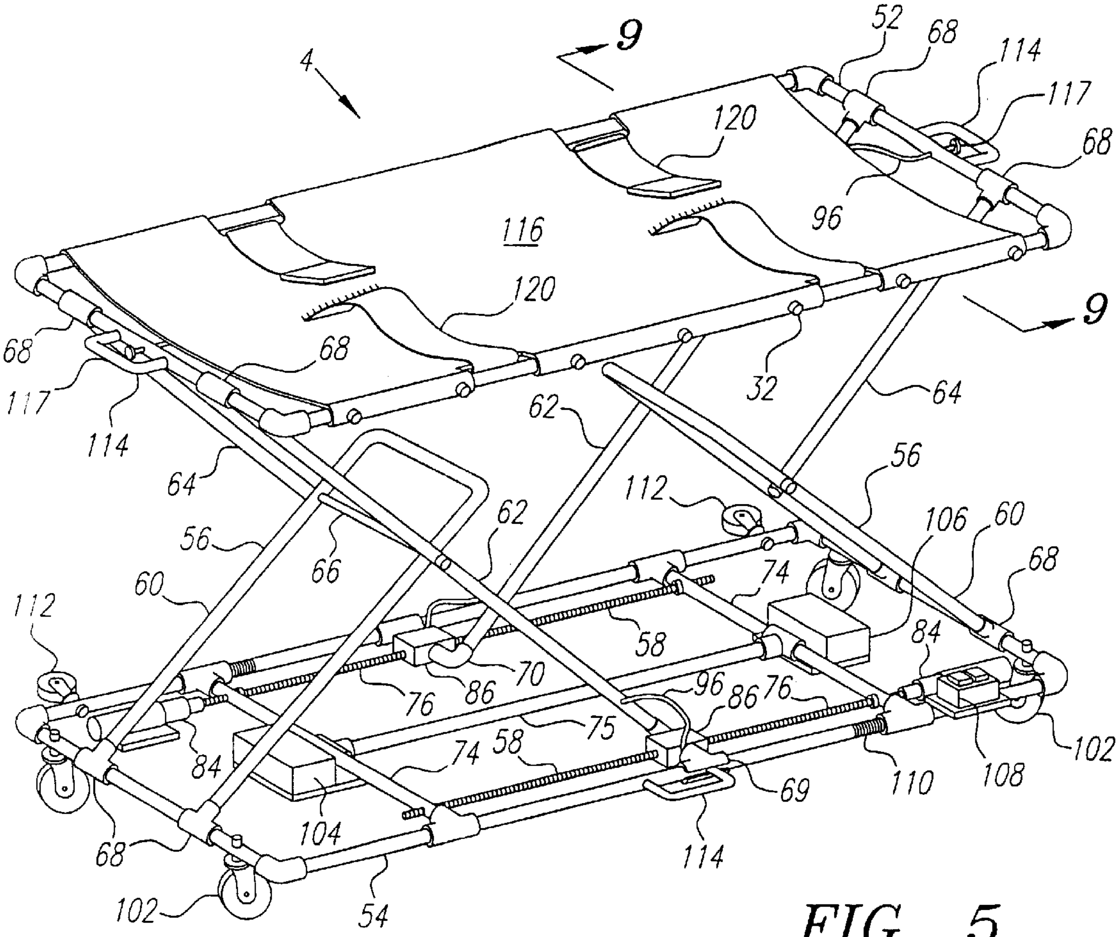
FIG. 5 is a top perspective view of a lift constructed in accordance with an embodiment of the invention and illustrates the lift in a partially raised position.
Figure 6:
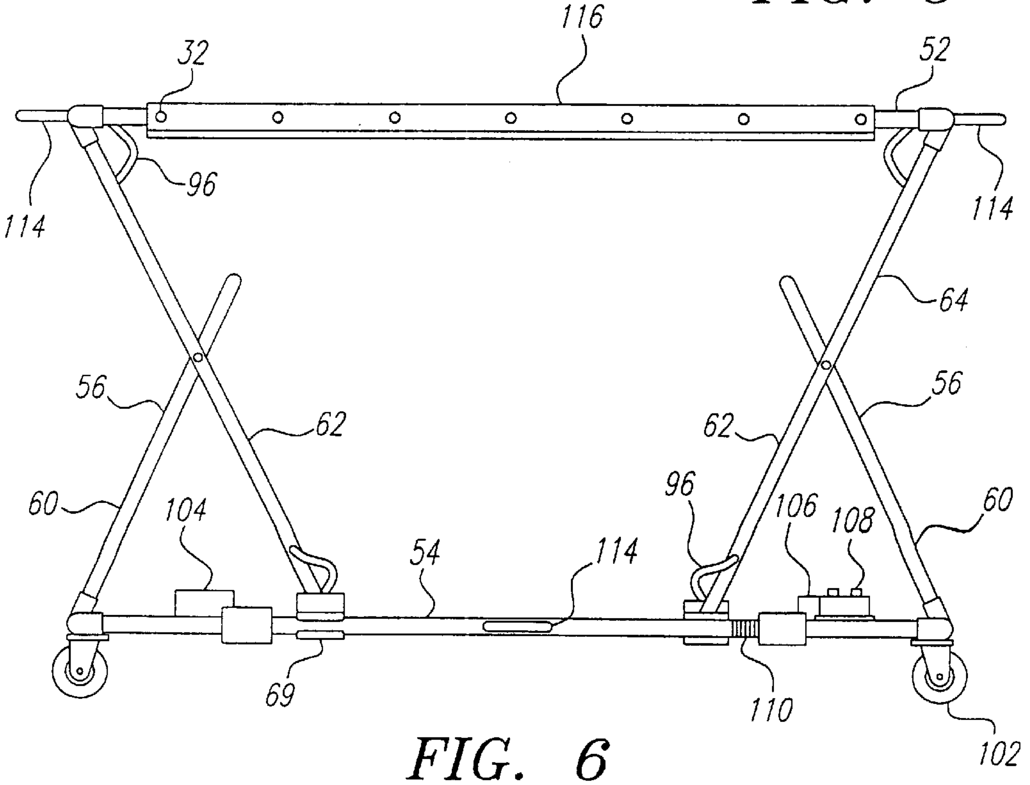
FIG. 6 is a side view of the lift of FIG. 5 in a fully raised position.

With reference to FIGS. 5 and 6, the lift 4 also preferably has a strong but light-weight construction, e.g. aluminum. The lift 4 has a lift frame 52, a base 54 and two sets of lifting mechanisms 56 which space the lift frame 52 from the base 54, and allow it to be raised and lowered by drive mechanisms 58 mounted on the base 54. The lift frame 52 and the base 54 also each have a generally rectangular shape. As in the cart 2, they may be constructed of three-quarter inch, schedule 40 aluminum pipe, with a clear anodize coating. In an alternative embodiment, they are constructed of 1.25" by 1.25" square stainless steel tubing or chrome plated steel. While the lift 4 will perform satisfactorily with frames 52 of a variety of sizes, the frames 52 for the lift 4 are preferably 24" by 54" for its primary use in assisting with animal care at animal hospitals, clinics and veterinarian offices.

With reference to FIGS. 5–8, a pair of lifting mechanisms 56 raise and lower the lift frame 52 from the base 54, and are preferably made of the same or similar metal tubing. Each of the lifting mechanisms 56 has a prop member 60, a lift arm 62, an auxiliary lift arm 64, a pivot pin 66, rotatable couplings 68 connecting the lift arm 62 and auxiliary lift arm 64 to respective ends of the lift frame 52, an elbow coupler 70 at the base of the lift arm 62, a drive link 72, and a "T" slide 69. The prop 60 is a generally U-shaped tubular frame. The free ends of the prop 60 are pivotally connected to an end of the base 54 by rotatable couplings 68 allowing the prop member 60 to pivot outwardly up and down with respect to the base 54. Proximate the top of the prop member 60 is a pivot pin 66 extending through holes defined by the sides of the prop member 60 and a hole defined at or about the midpoint of the lift arm 62. The pin 66 also extends through a hole defined by the auxiliary lift arm 64. The pin 66 is secured by standard means so that it stays in place. The auxiliary lift arm 64, vertically propped by prop member 60, works with the lift arm 62 to support a respective end of the lift frame 52. Movement of each lift arm 62 drives the coupled prop member 60 and auxiliary lift arm 64.

Figure 7:
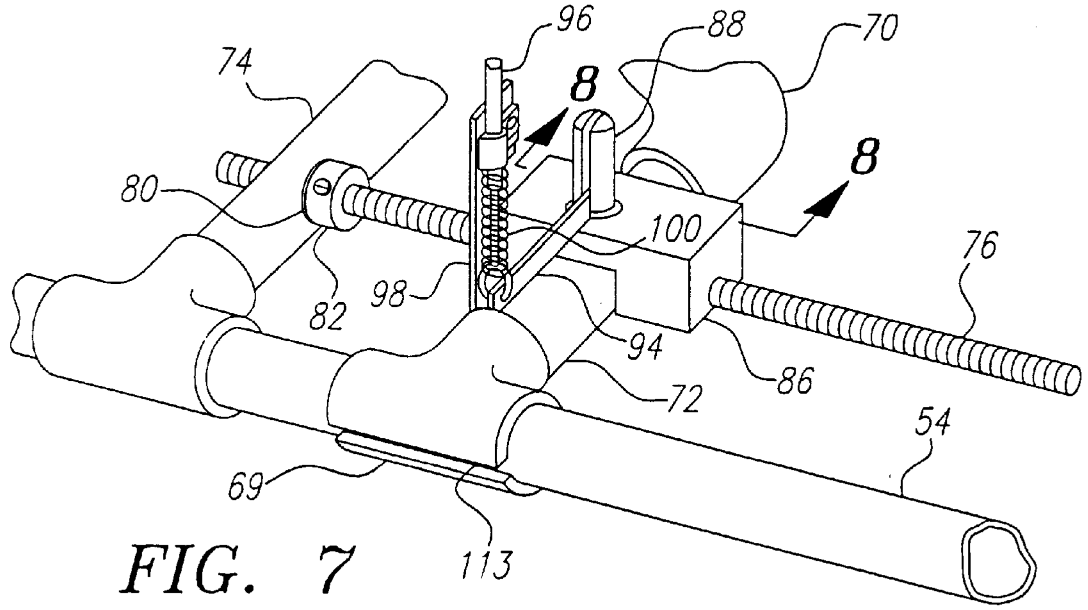
FIG. 7 is a partial perspective view of a lift drive mechanism constructed in accordance with an embodiment of the invention.

With reference to FIGS. 5 and 7, the lower end of each lift arm 62 is slidably connected to a side member of the base 54 via the elbow 70 and the drive link 72, the latter of which is connected to the side member of the base 54 by means of a T-slide 69. As will be described in more detail below, the T-slide 69 has a slot 113 in order to prevent interference with a handle 114. The drive link 72 freely rotates in the elbow 70. Two cross members 74 run laterally between opposite side members of the base 54. The cross members are disposed near opposite ends of the base 54, each just beyond respective extents of travel of the T-slides 69.

With reference to FIGS. 5–7, the drive mechanisms 58 used to power the two lifting mechanisms 56 each have a screw gear 76, a bushing 78, two thrust bearings 80, two locking collars 82, a drive motor 84 and a drive block 86. The screw gears 76 are free to turn in bushings 78 disposed in holes through the lift arm drive links 72. Likewise, the screw gears 76 are inserted through, and are free to turn in, thrust bearings 80 disposed in holes through the lateral braces 74. Locking collars 82 secured to the screw gears 76 at the lateral braces 74 keep the screw gears 76 in place. Drive motors 84 are mounted on respective brackets attached to opposite corners of the base 54.

Figure 8:
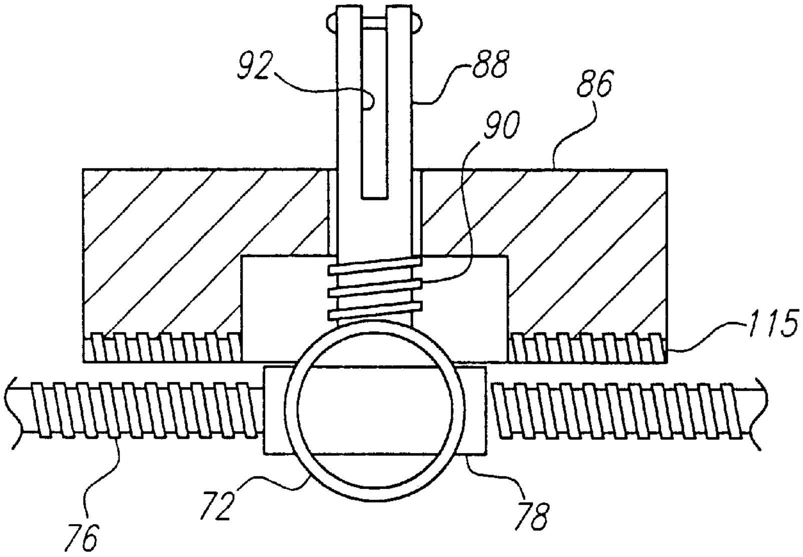
FIG. 8 is a cross-sectional view of the lift drive mechanism of FIG. 7 taken along line 8—8 of FIG. 7.

With reference to FIGS. 7 and 8, each drive block 86 has a generally "C" shaped longitudinal cross-section and has screw threads 115 defined in a down-facing screw gear channel. The threads 115 correspond with the threads of the screw gear 76, and when the drive block 86 is lowered onto the screw gear 76, the threads engage. A post 88 extends vertically through a hole disposed in the center of each drive block 86, perpendicular to the axis of the block's threads. A coil spring 90 is disposed over the lower end of the post 88 in a gap between the two legs of the drive block 86. The spring 90 floats on the lower end of the post 88 which rests on top of the drive link 72. The coil spring 90 pushes up on the underside of the drive block 86, biasing it so the block 86 is disengaged from the screw gear 76. A slot 92 runs vertically through the upper half of the post 88. A release arm 94, preferably L-shaped, is disposed in the slot 92 with the short leg of the "L" pointing upward and pinned near its end by a pin through the top of the post 88. The slot 92 is long enough for the short leg of the release arm 94 to pivot to a vertical position and be within the slot 113. The length of the short leg of the release arm 94 is such that when the release arm 94 is pivoted downward, the bottom corner of the release arm 94 contacts the top surface of the drive block 86 and pushes it downward, overcoming the upward biasing force of the coil spring 90, to engage the drive block 86 with screw gear 76.

In this position, the release arm 94 will hold the drive block 86 so that its screw threads 115 remain engaged with the screw gear 76.

In operation, the lower end of each stiff leg, i.e. lift arm 62, is slidably coupled to a track mounted on the base 54, namely a base side member, the lower end being moveable between opposite ends and the track's range as limited by the cross members 74. At a first end, the stiff leg 62 is lying down against the base 54, but at a second end the stiff leg 62 is as upright as it can get.

With reference to FIGS. 5 and 7, release cables 96 extend through respective ends of the lift frame 52. The release cables 96 each have a wire slidably enclosed in a flexible sheath, and each have a control knob 117 attached to a free end of the wire. The knobs are adjacent respective end members of the lift frame 52. Each cable is routed to the nearest lift arm 62. The cables can be routed alongside their lift arms 62 to a respective drive block 86, but preferably they are routed through the insides of the lift arms 62. This will shield the cable 96 and protect it from becoming snagged or caught on objects over the span of its length. This will also preclude the necessity of cable ties or clamps which would otherwise be needed to secure the cable to the lift arm to prevent it from becoming snagged on objects. The lower end of each cable 96 is secured by clamps, or equivalent, to a cable mounting bracket 98 attached to respective lift arm drive links 72. At the lower end of each release cable 96, the flexible sheath is trimmed to allow the enclosed wire to be connected to the end of the long leg of a respective release arm 94. A coil spring 100 disposed over each cable wire end biases the release arm 94 downward, which in turn holds the drive block 86 in a lowered position with its threads engaged with the screw gear 76.

With reference again to FIGS. 5 and 7, pivoting wheels 102 extending beneath the base 54 near its corners allow the lift 4 to be easily moved and maneuvered. A battery 104 is mounted on a bracket secured approximately in the center of the cross member 74 to prevent interference with the lift mechanism 56. A battery charger 106 is likewise secured to a mounting bracket attached near the center of the other cross member 74 so that it does not interfere. Foot switches 108 for operating the drive motors 84 are mounted on the base 54, preferably adjacent to at least one of the drive motors 84. The foot switches 108 can be mounted on both sides of the base 54 to allow operation from either side. Wiring (not shown) interconnects the battery 104, battery charger 106, drive motors 84 and foot switches 108. The wiring can conveniently be routed between the electrical components by means of the hollow tubing of the cross members and side members of the base 54 where needed. This will protect the wiring from becoming entangled on objects and will present a neater, cleaner appearance. An AC line cord (not shown) is attached to the battery charger 106 to allow it to be plugged into an available AC outlet for recharging the battery 104.

With reference to FIGS. 5 and 6, a pair of coil springs 110 are disposed around respective side members 54 of the base between lateral braces 74, nearest drive motors 84 and lift arm slides 69. When the lift 4 is in its lowered position, with the lift frame 52 lowered to a point near the base 54, the link arms 72 will be in their most retracted position. In this position, the slides 69 will compress respective springs 110. When the drive motors are actuated to raise the lift 4, the springs 110 act to provide an initial starting force to assist in driving the lift arms 62 up. This initial push assists the drive motors 84 in overcoming the reduced leverage of the lifting mechanism 56 in their extreme lowered position, after which the drive motors 84 can easily move the lifting mechanisms 56 to raise and lower the lift frame 52. The springs 110 also cushion the initial force to the links 72 by the screw gears 76 and provide balance between the two links 72 so they can each be moved together, allowing for both ends of the lift frame 52 to be raised together, maintaining a level orientation.

For convenience, when the lift 4 is in its lowered or compressed configuration, it can be rolled on edge, suitcase style, on wheels 112 attached to the outward side of one of the side members of the base 54. A handle 114 is attached in the same plane on the opposite side of the base 54. Because of this handle 114, the slide 69 must be slotted (see FIG. 7) in order to avoid interference with the handle 114.

An additional handle 114 is preferably attached to each of the end members of the lift frame 52 for convenience when manually raising the lift 4 and for maneuvering the lift 4.

With reference to FIGS. 5–8, the lift 4 has a quick-lift feature which allows the lift frame 52 to be quickly, manually lifted to a desired level or to a position where one end of the upper frame 52 is at a different level than the other. This is accomplished by pulling on the knobs 117 at the ends of the release cables 96 to cause the long legs of the release arms 94 to be lifted by the wire in the cable 96 attached to the knob 117. This causes the release arms 94 to pivot in their posts 88, removing the downward forces of the release arms 94 from the top of the drive blocks 86. However, when there is a load on the upper frame 52, the threads 115 of the drive blocks 86 will remain engaged with the screw gears 76, overcoming the upward bias of the coil springs 90, so the upper frame 52 will maintain its position and will not inadvertently fall. But when the load is released, as by manually lifting the upper frame 52, preferably by use of the handles 114, the load is released from the engaged threads 115 of the drive blocks 86 and the screw gears 76.

With the load released, the springs 90 are then free to lift the drive blocks 86 from the screw gears 76. With the threads no longer engaged, the lift frame 52 is free to be manually lifted or lowered quickly, without having to wait for the screw gears 76 to move the lifting mechanisms 56.

When the lift frame 52 is manually lifted to its desired position, the knobs 117 of the release cable 96 can be released which will allow the cable springs 100 to push the long legs of the release arms 94 downward, causing the release arms 94 to pivot in posts 88 and push the drive blocks 86 downward, overcoming the upward bias of the lift springs 90. This will cause the threads 115 of the drive blocks 86 to again engage the threads of the screw gears 76, and the release arms 94 and engaged load will hold the drive block threads 115 engaged with the screw gears 76. The lift frame 52 will, thus, maintain its new manually selected position, even if one end of the lift frame 52 is positioned at a different level than the other end. From this position further adjustment may be made by the drive mechanisms 58 by use of the foot switches 108, or by further manual positioning, by releasing the drive blocks 86 as previously described. When use of the lift 4 has been completed after manually positioning the lift frame 52, it should be manually leveled again. This can be accomplished by releasing the drive blocks 86, as described, and manually lowering the lift frame 52 to its compressed position so that the mechanisms 56, 58 will once again be ready to raise the lift frame 52 in a level orientation.

Figure 9:
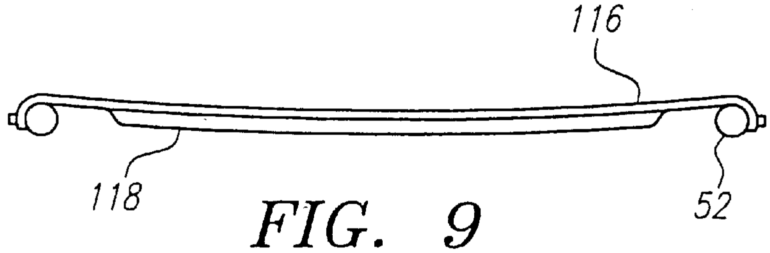
FIG. 9 is a cross-sectional view of the flexible support of the lift of FIG. 5 taken along line 9—9 of FIG. 5.

With reference to FIGS. 5, 6 and 9, a flexible support sheet 116 similar to the support sheet 30 of the cart 2, is attached to the side members of the lift frame 52 by a plurality of quick release snaps 32 attached near the edges of the support sheet 30. The snaps 32 engage with mating portions of the snaps 32 which are attached near the outward sides of the frame 52. This sheet 116 is made of the same material as the sheet 30 for the cart 2 and can easily be replaced, cleaned and disinfected. The flexible support 116 is used for resting an animal thereupon. As more clearly shown in FIG. 9, the flexible support sheet 116 has an additional layer of flexible material attached to its underside to form a pocket 118. A resuscitation board (not shown), e.g. a thin rigid board, can be slid into the pocket 118 so that CPR can be performed on an animal, if necessary, since the board provides a rigid support for the procedure. Belts 120 preferably having quick release fasteners (e.g. hook and loop) are disposed at appropriate locations along on the flexible support 116 to aid in securing an animal in position on the lift 4. The ends of the belts 120 are attached at edges of the flexible support sheet 116. As is the case for the flexible support sheet 30 of the cart 2, this allows the flexible support 116 to be removed from the upper frame 52 for use away from the lift 4 and still have the belts 120 attached to help secure an animal. The belts 120 can also be used as handles or straps to allow the flexible support 116 to be used for carrying an animal for short distances, such as from the lift 4 to a table.

This invention is ideal for use when an animal in need of care must be picked up and transported to receive that care. If the animal is located where the lift 4 cannot easily be taken, the cart 2 can be wheeled or carried to the animal's location. This can be for relatively long distances, over relatively rough terrain, since the cart 2 is light and adapted for relatively rough terrain. The legs 20 of the cart 2 can pivot outward by releasing the locking pins 24 on the legs 20 allowing the cart frame 6 to be placed on the ground. The cart's flexible support 30 can be released on one side 12 and the cart 2 can be placed on the ground around the animal. The flexible support 30 can then carefully be pulled under the animal and reattached to the frame 6 of the cart 2. The cart 2 can then be lifted to allow the curved legs 20 to be secured, by the detent pins 24, in a vertical position under the frame 6 so the cart 2 can be wheeled back to the lift 4.

In the event the cart frame 6 cannot be positioned around the animal, the flexible support sheet 30 can be removed entirely from the frame 6 and can be carried to the animal where the sheet 30 can be pulled under the animal. The belts 34 will allow the animal, on the sheet 30, to be lifted and carried to a location where the sheet 30 can be reattached to the frame 6 of the cart 2.

With the lift 4 in its lowered position, the cart 2 can be wheeled over the lift 4. The lift 4, with the cart 2 and animal thereon can then be wheeled to a vehicle for transportation, or the lift 4 can be moved to a desired location and the lift frame 52 raised to allow for care of the animal. The lift frame 52 can be raised by pushing a foot switch 108 to cause the drive motors 84 to turn the screw gears 76, aided initially by the push springs 110. The screw gears 76, turning in the threads 115 of the drive blocks 86 move the lift arms 62 back towards opposite ends of the frame 52, causing the props 60 to pivot upward. This causes the lift frame 52, supported by the lift arms 62 and the auxiliary arms 64, to be raised to the desired level, remaining parallel with the base 54. The animal can be wheeled on the lift 4 to where it can be treated, or can be treated on the lift 4. CPR can be performed on the animal because of the resistance provided by the resuscitation board in the pocket 118 of the flexible support 116.

The cart 2, if left resting on the lift 4, can be used to lift and move the animal from the lift 4 to an operating table where the support sheet can be released from the cart 2, allowing the cart frame 6 to be removed. Or, the support sheet 30 can be released from the cart frame 6 and, by use of its belts 34, the animal can be lifted and carried on the sheet 30 to an operating table.

While the lift frame 52 can be raised and lowered easily by use of the drive mechanisms 58, the quick-lift feature described previously can be used to manually raise or lower the lift frame 52 to a desired position. The quick-lift feature can also be used for positioning the lift frame 52 in a non-horizontal position.

With reference to FIGS. 10–14, a cart 172 and lift 174 constructed in accordance with an alternative, preferred embodiment of the invention will now be described.

Figure 12:
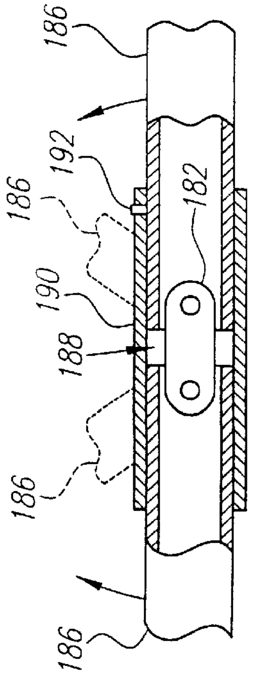
FIG. 12 is a side view of the joint of FIG. 11 taken along line 12—12 of FIG. 11.

With reference specifically to FIGS. 10–12, the cart 172 has a collapsible polygonal frame 176, preferably in the shape of a rectangle and made of structural tubular aluminum such as that described above with respect to FIGS. 1–4. The frame 176 preferably includes a black anodized coating or a clear anodized coating. The frame 176 includes a front frame member 178 and a rear frame member 180 pivotally connected by a connecting link 182. When connected, the frame members 178 combine to form end members 184 and elongated side members 186.

The front frame member 178 and rear frame member 180 include respective forked ends that form recesses to receive the connecting link 182 for pivotal attachment with appropriate fasteners. A joint 188 is created where the connecting link 182 is pivotally attached to the frame members 178, 180.

Figure 3:
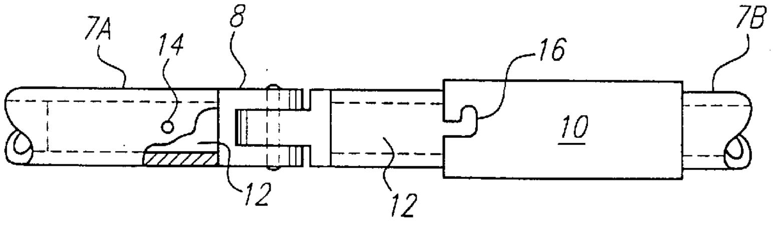
FIG. 3 is a top plan view of a vertically pivoting joint in a long side of the cart frame.
Figure 4:
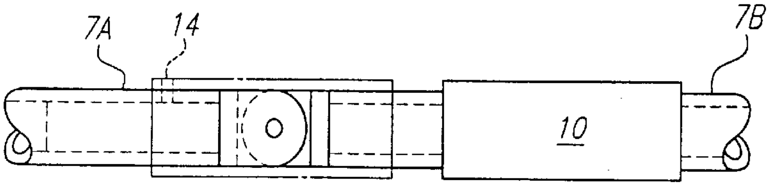
FIG. 4 is a side view of the joint of FIG. 3.

With reference to FIGS. 11 and 12, the joint 188 is preferably locked and unlocked in the same manner as that described with respect to FIGS. 3–4. A slidable sleeve 190 is moved over the pivoting joint 188 until it engages a locking pin 192 in an L-shaped channel 194 defined at an end of the sleeve 190. The sleeve 190 is locked in place by twisting it so that the pin 192 is caught in the base leg of the L-shaped channel 194. The joint 198 is unlocked by twisting the sleeve 190 in the opposite direction and moving the sleeve 190 away from and off of the joint 188.

A pair of rear wheels 196 similar to the wheels 18 described above with respect to FIGS. 1–2 are coupled to the side members 186 of the frame 176. The wheels 196 are rotatably attached to generally triangular brackets 198 with appropriate fasteners. Each bracket 198 includes a forked portion for connecting each bracket 198 to a side member 186 with appropriate fasteners. The wheels 196 are located adjacent to the end member 184 of the rear frame 180, both longitudinally and vertically, for added stability and support when towing the cart 172.

Near an opposite end of the frame 176, a pair of casters 202 are coupled to respective side members 186 of the front frame 178. Each caster 202 preferably includes a brake for locking the wheel in place.

A flexible support sheet or sling 206, similar to the support sheet 30 discussed above with respect to FIGS. 1 and 2, spans the length and width of the frame 176, connected to the end members 184 and side members 186 of the frame 176. The flexible support sheet 206 is made of a water-resistant material such as, but not by way of limitation, canvas coated with vinyl or a heavy-duty nylon. Quick-release snap fasteners 208 are used to attach the edges of the support sheet 206 to the frame 176. Opposite handles 210 extend laterally from the support sheet 206 beyond the side members 186 of the frame 176.

Straps 212, preferably including quick-release fasteners such as hook and loop material 214, extend from the support sheet 206 at appropriate locations along the support sheet 206 to strap an animal onto the sheet 206. The straps 212 may extend from the top or bottom of the support sheet 206 and may be removable, e.g. with belt loops, or permanently attached to the support sheet 206, e.g., with stitching. An end strap 215 extends from the support sheet 206 and includes a quick-release fastener such as hook material 217 which cooperates with loop material 219 on the underside of the support sheet 206 for holding the cart frame members 178, 180 together when the cart 172 is collapsed.

A handle 216 is pivotally connected to the end member 184 of the front frame 178 by pin-type tee connectors 218. The handle 216 includes a first tow arm 220 connected to a second tow arm 222 by a pin connector 224. The handle 216 includes an obround gripping portion 226, a narrow intermediate portion 228, and a forked connecting portion 230. The tee connectors 218 include removable pins that, when removed, allow the handle 216 to be removed from the frame 176.

Figure 13:
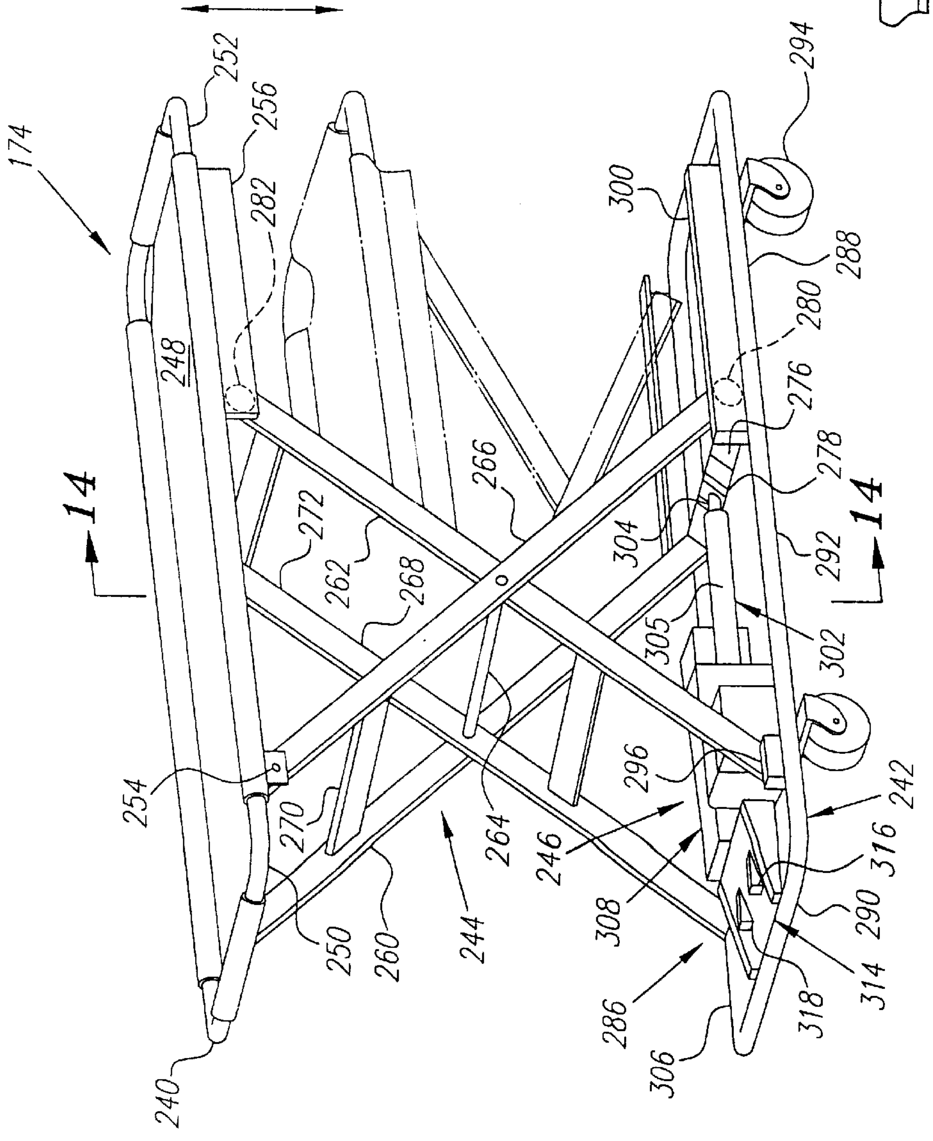
FIG. 13 is a top perspective view of a lift constructed in accordance with a preferred embodiment of the invention.
Figure 14:
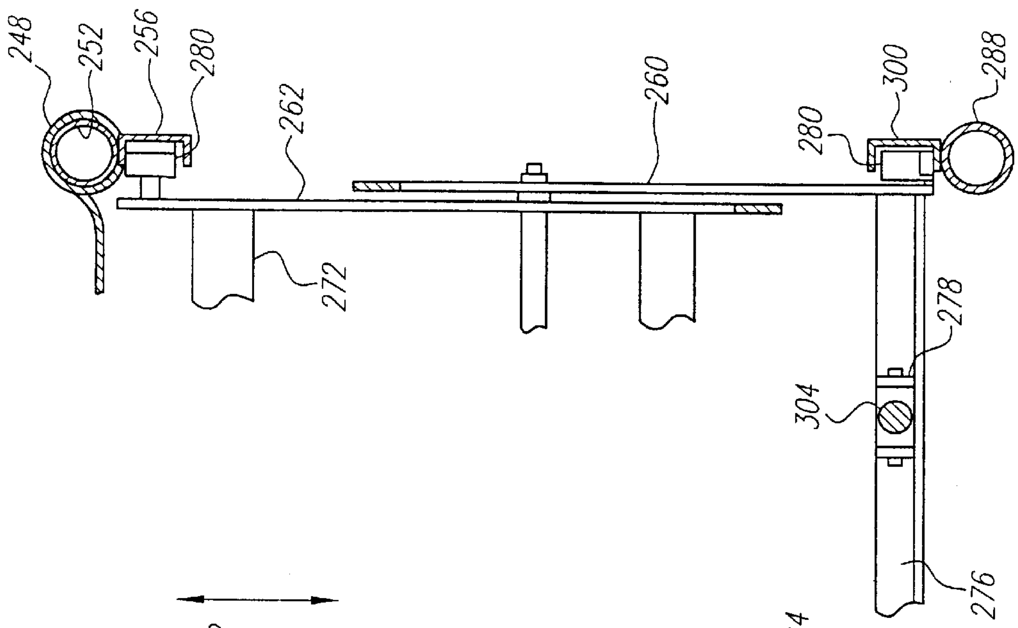
FIG. 14 is a cross-sectional view of the lift taken along line 14—14 of FIG. 13.

With reference to FIGS. 13 and 14, the lift 174 includes a lift frame 240, a base 242, a lifting mechanism 244 located between the lift frame 240 and the base 242 for raising and lowering the lift frame 240, and a driving mechanism 246 for driving the lifting mechanism 244.

The lift frame 240 carries a rigid support sheet or tray 248, both of which have a generally rectangular shape and are preferably made of a stainless steel or chrome-plated steel. The lift frame 240 has end members 250 and side members 252. An underside of the lift frame 240 includes a pair of pivot members 254 and a pair of upper channel members 256. A thwart (not shown) extends laterally across the frame 240, between channel members 256.

The driving mechanism 246 is preferably a scissor assembly comprised of a driven scissor 260 pivotally connected to a follower scissor 262 by a center pivot shaft 264. The driven scissor 260 and follower scissor 262 include respective lift arms 266, 268 and lateral supports 270, 272. The driven scissor 260 is pivotally attached at an upper end to the pivot members 254 of the lift frame 240 by appropriate fasteners. The driven scissor 260 includes a lateral bottom support 276 at a lower portion of the scissor 260. A pivot member 278 extends from the lateral bottom support 276. Lower cam followers 280 extend outwardly from the lower ends of the lift arms 266 of the driven scissor 260. Upper cam followers 282 extend outwardly from the upper ends of the lift arms 268 of the follower scissor 262 and are slidably received within channels of the upper channel members 256.

The base 242 includes a base assembly 286 comprised of a base frame 288 with a construction similar to that of the lift frame 240 and a number of additional components. The base frame 286 includes end members 290 and side members 292.

The additional components of the base assembly 286 will now be described. Four swivel casters 294 are connected to the side members 292, along the underside of the side members 292, for rolling the lift 174 on a surface. Pivot members 296 are connected to opposite side members 292 of the frame 288 near one end of the frame 288. The follower scissor 262 is pivotally connected to the pivot members 296 with an appropriate fastener. Lower channel members 300 are connected to an upper side of the side members 292. The channel members 300 include respective channels for slidably receiving the cam followers 280 of the follower scissors 262.

The driving mechanism 246 is a linear actuator 302 including an actuator rod 304 that reciprocates within a sleeve 305. The actuator rod 304 is driven by a 24 V D.C. motor and an electromechanical ballscrew actuator. The actuator rod 304 is pivotally connected to the pivot member 278 of the lifting mechanism 244, i.e., scissor assembly, with an appropriate fastener for driving the lifting mechanism 244 and, thus, raising and lowering the lift frame 240. The actuator 302 is attached to an actuator attachment arm (not shown), which is supported by an actuator shelf 306, for supporting the actuator 302.

A combination controller and a rechargeable battery pack 308 for the actuator 302 is supported by a controller shelf 310, which is supported by the base frame 288. A remote battery charger (not shown) is used to charge the battery pack for the actuator 302. A foot switch 314 is coupled to the controller 308 for controlling the actuator 302, and, thus, the raising and lowering of the lift frame 240. The foot switch 314 includes a raise button 316 and lower button 318 for raising and lowering the lift frame 240. The foot switch 314 is supported by the actuator shelf 306.

The cart 172 and lift 174 will now be described in use. When an immobile large animal needs to be transported, the cart 172 is preferably carried (in a collapsed state) to the site of the animal and erected. The cart 172 is normally in a collapsed or folded state for convenient storage of the cart 172 in a motor vehicle, garage, storage cabinet, etc. In a collapsed state, the side members 186 of the frame 176 are pivoted or folded together about joints 188 (See FIG. 12). The handle 216 may be removed from the end member 184 of the front frame member 178 by removing the pins on the tee connectors 218 or pivoted under the collapsed frame 176 and support sheet 206. To erect the cart 172, the side members 186 and support sheet 206 are unfolded so that front frame member 178, rear frame member 180, and support sheet 206 are generally coplanar. The frame 176 is locked in this position by sliding the sleeves 190 over the joints 188 so that the lock pin 192 resides in the base of the L-shaped channel 194 and by twisting the sleeves 190 (See FIG. 11). If the handle 216 was not previously removed from the cart 172, the handle 216 is simply pivoted to a position such as that shown in FIG. 10, where it is not under the cart 172. If the handle 216 was previously removed, the handle 216 is attached to the front end member 184 with the tee connectors 218 by replacing the associated pins and/or fasteners. The large animal may then be lifted or rolled onto the cart 172. Alternatively, if this is not possible or desirable, the support sheet 206 may be unfastened from the frame 176, and the support sheet 206 may be slid, pulled or located underneath the large animal. The support sheet 206 is then reattached to the frame 176. The support sheet 206 could also be partially detached from one side member 252 of the frame 176, slid or pulled underneath the large animal, and reattached to the frame 176 after pivoting the frame 176 over the animal. Once the large animal is on the cart 172, the animal is preferably strapped and fastened in with the connection straps 212 and wheeled or carried, whichever is more convenient, with the cart 172 to the lift 174. On some occasions, it may be difficult or inconvenient to use the cart 172 to transport the animal. On these occasions, the support sheet 206 may be used alone to carry the animal to the lift 174. The support sheet 206 is simply placed underneath the large animal by pulling, sliding or locating the support sheet 206 underneath the animal. Then, the animal is preferably strapped and fastened in with the connection straps 212 and carried on the support sheet 210 to the lift 174 using the handles 210.

The large animal is loaded onto the lift 174 with the lift frame 240 completely lowered. The lift is lowered by stepping on the lower button 318 of the foot switch 314. This causes the actuator rod 304 of the actuator 302 to reciprocate outward, out of the actuator sleeve 305. This imparts longitudinal movement of the lower cam followers 280 within the channel of the lower channel members 300 towards the end of the base 242, which, in turn, imparts longitudinal movement of the upper cam followers 282 within the channel of the upper channel members 256 in the same direction.

Simultaneously, the upper ends of the follower scissor 262 pivot with respect to the lift frame 240 and the lower ends of the driven scissor 260 pivot with respect to the base frame 288. As shown by the phantom lines in FIG. 13, this movement imparted to the lifting mechanism 244 causes the scissor assembly to collapse and the lift frame 240 to be lowered while remaining parallel to the base frame 288. When the lift 174 is positioned in its lowest position, adjacent the base, the actuator rod 304 extends substantially out of the actuator sleeve 305.

When the lift 174 is in this lowered position, the large animal is preferably transferred to the rigid support sheet 248 of the lift 174 using the cart 172 or the flexible support sheet 206. If the cart 172 is used to transfer the animal, the handles 210 are used to transport the cart 172 and animal onto the lift 174. The snap fasteners 208 of the cart 172 are then unfastened and the cart frame 176 is removed from the flexible support sheet 206, with the flexible support sheet 206 remaining under the animal. If the flexible support sheet 206 is used alone to transfer the animal, the snap fasteners 208 of the cart 172 are removed while the cart 172 is on the ground and the cart frame 176 is removed from the flexible support sheet 206. The animal is then transported on the flexible support sheet 206 using the handles 210 of the sheet 206. In the event that the cart frame 176 was never used to transport the large animal to the lift 174, i.e., the flexible support sheet 206 was used alone, the support sheet 206 will obviously not have to be detached from the cart 172 while the animal is located on the support sheet 206. The flexible support sheet 206 preferably remains under the animal while the animal is on the rigid support sheet 248 of the lift 174 to prevent the large animal from being further disturbed and to assist in later moving the animal.

Once the animal has been transported to the lift 174, the lift 174 is raised by stepping on the raise button 316 of the foot switch 314. This causes the actuator rod 304 of the actuator 302 to retract or reciprocate inward with respect to the sleeve 305. This imparts longitudinal movement of the lower cam followers 280 within the channel of the lower channel members 300 in the direction opposite of the arrow illustrated in FIG. 12, which, in turn, imparts longitudinal movement of the upper cam followers 282 within the channel of the upper channel members 256 in the same direction. Simultaneously, the upper ends of the follow scissor 262 pivot with respect to the lift frame 240 and the lower ends of the driven scissor 260 pivot with respect to the base frame 288. This movement imparted to the lifting mechanism 244 causes the lift frame 240 to be raised while remaining parallel to the base frame 288. The actuator rod 304 no longer retracts once it reaches the fully retracted position illustrated in FIG. 13.

For temporary storage of the lift 174 within a motor vehicle or more permanent storage of the lift 174 in an area such as a garage, the lift 174 is preferably lowered to its lowest position.

The lift 174 can then be wheeled to a desired location such as a transportation vehicle or from a transportation vehicle to a veterinarian facility, animal clinic, animal hospital, human society, canine unit, zoo, etc. Treatment can be given to the animal with the animal on the rigid support sheet 248 of the lift 174. Alternatively, the flexible support sheet 206, since it is separate from the lift 174, can be used to transport the animal from the lift 174 to an operating table.

The foregoing description and drawings were given for illustrative purposes only, it being understood that the invention is not limited to the embodiments disclosed, but is intended to embrace any and all alternatives, equivalents, modifications and rearrangements of elements or steps falling within the scope of the invention as defined by the following claims.

We claim:

1. A method of transporting and lifting a large immobile animal for treatment of the animal, comprising:

providing a transport cart adjacent to the animal, the transport cart including a generally rectangular collapsible frame having a front frame member pivotally attached to a rear frame member, a set of wheels attached to the rear frame member for rolling movement of the cart, a handle pivotally attached to the front frame member, and a removable support sheet carried by the frame;

at least partially removing the support sheet from the frame;

locating the support sheet under the animal;

attaching the support sheet to the frame with the animal on the support sheet;

transporting the animal on the cart to a lift, the lift including a base supported by wheels for rolling movement of the lift, a lowered generally rectangular support frame, a generally rectangular support sheet carried by the generally rectangular support frame, a frame lifting mechanism disposed between the base and the frame, and a driving mechanism coupled to the lifting mechanism;

separating the support sheet and cart frame;

transporting the animal onto the lift with the support sheet of the cart; and lifting the animal by actuating the driving mechanism so that the animal is raised to a height suitable for treatment or transferring the animal to a treatment table.

2. The method of claim 1, wherein the front frame member and rear frame member are pivotally attached to each other at a pair of joints, a pair of sleeves slidably attached to said frame for sliding movement over said joints, the method further comprising locking said frame members with respect to each other by sliding said sleeves over said joints.

3. The method of claim 1, wherein the support sheet of the cart is a flexible support sheet including handles on opposite sides of said sheet for carrying said sheet alone or said sheet and cart.

4. The method of claim 1, wherein the support sheet of the cart includes straps for holding the animal to the support sheet, the method further including strapping the animal to the support sheet.

5. The method of claim 1, wherein the handle is removable from said cart frame.

6. The method of claim 1, further including collapsing said cart frame by pivoting said frame members towards each other.

7. The method of claim 1, wherein the drive mechanism includes a reciprocating actuator coupled to a battery, foot switch and controller.

8. The method of claim 1, wherein the lifting mechanism includes a driven scissor pivotally attached to a follower scissor, the follower scissor including a lower end pivotally attached to the base and an upper end slidably received within a channel member of the lift support frame, the driven scissor having an upper end pivotally attached to the support frame and a lower end slidably received within a channel member of the base and driven by the driving mechanism.

9. The method of claim 1, wherein the support sheet of the lift is constructed of a rigid material.

10. The method of claim 1, wherein at least partially removing the cart support sheet from the cart frame and locating the support sheet under the animal includes completely removing the support sheet from the frame and sliding the support sheet under the large animal.

11. The method of claim 1, wherein at least partially removing the cart support sheet from the cart frame and locating the support sheet under the animal includes partially removing the support sheet from the frame and sliding the support sheet under the large animal.

12. The method of claim 11, further including placing the frame over the large animal after sliding the support sheet under the large animal and attaching the support sheet to the frame with the animal on the support sheet.

13. The method of claim 1, wherein detaching the support sheet and cart frame and transporting the animal onto the lift with the support sheet includes lifting the support sheet and cart frame followed by separating the support sheet and cart frame.

14. The method of claim 1, wherein the step of transporting the animal on the cart to the lift includes carrying the cart, with the animal, to the lift.

15. The method of claim 1, further including moving the animal from the lift to an operating table with the cart support sheet for treatment of the animal.

16. A method of transporting and lifting a large immobile animal for treatment of the animal, comprising:

carrying a collapsed transport cart over to the large immobile animal, the transport cart including a generally rectangular frame having a front frame member pivotally attached to a rear frame member at a pair of joints, a pair of sleeves slidably attached to said frame members for sliding movement over said joints, the front frame member pivoted adjacent to the rear frame member, a set of wheels attached to the rear frame member for rolling movement of the cart, a handle pivotally attached to the front frame member, the handle pivoted adjacent the frame members, and a removable flexible support sheet carried by the frame members and folded therewith, the flexible support sheet including handles on opposite sides of said sheet and straps for holding the animal to the support sheet;

assembling the transport cart by unfolding the frame members and support sheet, and locking said frame members with respect to each other by sliding said sleeves over said joints;

at least partially removing the support sheet from the frame;

locating the support sheet under the animal;

strapping the animal to the support sheet with the straps;

attaching the support sheet to the frame with the animal on the support sheet;

pulling the animal on the cart to a lift, the lift including a base supported by wheels for rolling movement of the lift, a lowered generally rectangular support frame, a generally rectangular rigid support sheet carried by the generally rectangular support frame, a frame lifting mechanism disposed between the base and the frame, and a driving mechanism coupled to the lifting mechanism;

separating the support sheet and cart frame;

transporting the animal onto the lift with the support sheet of the cart; and lifting the animal by actuating the driving mechanism so that the animal is raised to a height suitable for treatment or transferring the animal to a treatment table.

17. The method of claim 16, wherein at least partially removing the cart support sheet from the cart frame and locating the support sheet under the animal includes completely removing the support sheet from the frame and sliding the support sheet under the large animal.

18. The method of claim 16, wherein at least partially removing the cart support sheet from the cart frame and locating the support sheet under the animal includes partially removing the support sheet from the frame and sliding the support sheet under the large animal.

19. The method of claim 18, further including placing the frame over the large animal after sliding the support sheet under the large animal and attaching the support sheet to the frame with the animal on the support sheet.

20. The method of claim 16, wherein the step of transporting the animal on the cart to the lift includes carrying the cart, with the animal, to the lift.

21. The method of claim 16, further including moving the animal from the lift to an operating table with the cart support sheet for treatment of the animal.

22. A cart for transporting a large immobile animal, comprising:

a generally rectangular collapsible frame having a front frame member pivotally attached to a rear frame member, via one or more joints;

at least one wheel attached to the rear frame member for rolling movement of the cart;

a handle pivotally attached to the front frame member;

a removable support sheet carried by the frame; and at least one sleeve adapted to lock said frame members with respect to each other when slid over said joint(s).

23. The cart of claim 22, wherein said cart further comprises a lift for raising said cart to a desired position.

24. The cart of claim 22, wherein the support sheet of the cart is a flexible support sheet including handles on opposite sides of said sheet.

25. The cart of claim 22, wherein the support sheet of the cart includes straps for holding the animal to the support sheet.

26. The cart of claim 22, wherein said cart handle is removable from said cart frame.

27. The cart of claim 22, further including a set of wheels attached to the front frame member for rolling movement of the cart.

* * * * *